United States Patent
Pul

(10) Patent No.: US 10,473,087 B2
(45) Date of Patent: Nov. 12, 2019

(54) MULTI AXES TURNTABLE, WIND TURBINE, AND TOWER FAN

(71) Applicant: George Pul, Las Vegas, NV (US)

(72) Inventor: George Pul, Las Vegas, NV (US)

( * ) Notice: Subject to any disclaimer, the term of this patent is extended or adjusted under 35 U.S.C. 154(b) by 220 days.

(21) Appl. No.: 15/790,004

(22) Filed: Oct. 22, 2017

(65) Prior Publication Data
US 2019/0120206 A1    Apr. 25, 2019

(51) Int. Cl.
*F03D 3/02* (2006.01)
*F03D 15/00* (2016.01)
*F03D 3/06* (2006.01)

(52) U.S. Cl.
CPC .............. *F03D 3/068* (2013.01); *F03D 3/02* (2013.01); *F03D 15/00* (2016.05); *F05B 2260/505* (2013.01)

(58) Field of Classification Search
CPC . F03D 3/068; F03D 3/02; F03D 15/00; F05B 2260/505
See application file for complete search history.

(56) References Cited

U.S. PATENT DOCUMENTS

| | | | | |
|---|---|---|---|---|
| 8,317,470 B2* | 11/2012 | Villella | ................. | F04D 25/088 416/140 |
| 8,368,240 B1* | 2/2013 | Burkett | .................... | F03D 9/00 290/44 |
| 8,403,623 B2* | 3/2013 | Krippene | .............. | F03D 3/0481 415/4.2 |
| 9,273,665 B1* | 3/2016 | Krippene | .............. | F03D 3/0481 |
| 9,328,717 B1* | 5/2016 | Walker | .................... | F03D 3/005 |
| 9,453,494 B2* | 9/2016 | Krippene | ................. | F03D 9/39 |
| 10,280,900 B1* | 5/2019 | Krippene | ................. | F03D 9/45 |
| 2006/0151664 A1* | 7/2006 | Yu | .......................... | B63H 13/00 244/4 R |
| 2017/0089093 A1* | 3/2017 | Pul | .......................... | E04B 7/166 |

* cited by examiner

*Primary Examiner* — Michael C Zarroli

(57) ABSTRACT

A Multi Axes Wind Turbine of the present invention comprises a multi axes turntable assembly in rotations with a mounted assembly of pairs of planet and sun airfoils for generating a net of substantial powers from generally straight flowing applied wind or airflow. Planet airfoils, been in a fixed rotational orientation relative to and in rotation around a stationary sun rotor, are always facing against applied wind. Different from planet airfoils, sun airfoils are in radial alignment to and in rotation around the sun rotor, and are rotated by applied wind from any direction. In combination, paired planet and sun airfoils alternate as wind shields in rotations around a stationary sun rotor to greatly enhance powers generated while greatly reduce powers lost. A Multi Axes Wind Turbine operated in reverse is a multi-axes tower fan to propel a substantial volume of generally straight flowing wind or airflow.

1 Claim, 6 Drawing Sheets

MULTI AXES TURNTABLE, WIND TURBINE, AND TOWER FAN

FIELD

The present invention relates generally to turntables, Vertical Axis Wind Turbines (VAWTs), and tower fans, where VAWT and tower fans are turntables with mounted airfoils; and more particularly, the present invention relates to those multi axes turntables, VAWTs, and tower fans, where multiple planet rotors rotate around a stationary sun rotor.

BACKGROUND OF THE INVENTION

Many types of vertical axis wind turbines (VAWTs) are in current use with airfoils mounted to, fixed with, and rotated by a rotating rotor for power generation from wind. Such VAWTs are powered by generally straight flowing wind, but can not in reverse be a tower fan to be powered to propel generally straight flowing wind in return. Compared to current VAWTs and tower fans, the present invention of Multi Axes Turntable, Wind Turbine, and Tower Fan, through complexities of having multiple planet rotors and paired planet and sun airfoils in rotations around a stationary sun rotor, has achieved differentiating features and capabilities, including: a Multi Axes Wind Turbine generates power from generally straight flowing wind, but can be powered in reverse as a Multi Axes Tower Fan to propel generally straight flowing wind in return; and a Multi Axes Wind Turbine and Tower Fan, by having planet airfoils persistently facing against and toward generally straight flowing applied or propelled air, are inherently more efficient in generating power and in propelling wind.

SUMMARY OF THE INVENTION

A Multi Axes Turntable, Wind Turbine, and Tower Fan of the present invention is a compilation of separate and related inventions for a Multi Axes Turntable, a Multi Axes Wind Turbine, and a Multi Axes Tower Fan, where a Multi Axes Turntable consists of multiple planet rotors rotating around a stationary sun rotor, and a Multi Axes Wind Turbine and Tower Fan are each a Multi Axes Turntable in rotation with paired planet and sun airfoils.

A Multi Axes Turntable of the present invention has multiple (one or more) identical rotating planet rotors, mounted to top and bottom carrier plates, and rotated around a stationary sun rotor. The sun rotor is fixed supported; and the rotational planet rotors rotate around the stationary sun rotor by a drive system, which maintains planet rotors in a fixed rotational orientation relative to and in rotations around a stationary sun rotor. The rotating planet rotors are equally spaced on a circumference around, and at the same radial distances away from the stationary sun rotor. A planet rotor is further comprised of a rotating shaft with cap and base plates.

A Multi Axes Wind Turbine of the present invention is a Multi Axes Turntable in rotation with one planet airfoil mounted to each planet rotor through its cap and base plates; and paired to each planet airfoil is a sun airfoil mounted to top and bottom carrier plates. All planet airfoils, been mounted to multiple planet rotors, are also in a fixed rotational orientation relative to and in rotations around a stationary sun rotor. Sun airfoils, been mounted to top and bottom carrier plates, are in radial alignment to and in rotation around the sun rotor. All paired sun and planet airfoils are rotated by top and bottom carrier plates at the same rotational rate around the stationary sun rotor. Paired sun and planet airfoils are curved in shapes similar to portions of a semi circle, and shares same or nearby center points; a sun airfoil is slightly larger than a planet airfoil for clearances as a planet airfoil rotates about its rotation center point passing by its paired sun airfoil; and planet airfoils size, to be freely rotating, is limited by the radial distance to the stationary sun rotor. A Multi Axes Wind Turbine has a power generator and control system to convert wind power to mechanical or electrical power, and it has an orientation mechanism and control system to rotate planet airfoils to face against generally straight flowing wind. The required power generator, orientation mechanism, and control systems are not novel or unique to a Multi Axes Wind Turbine of the present invention, and are not further described.

A Multi Axes Tower Fan of the present invention is a modified Multi Axes Wind Turbine rotating in reverse, with or without sun airfoils, and is powered to propel generally straight flowing wind. A Multi Axes tower fan has a motor and control system to convert electrical or mechanical power to propel generally straight flowing wind; and it has an orientation mechanism and control system to rotate planet airfoils to face toward generally straight flowing propelled wind. And again, the required power motor, orientation mechanism, and control systems are not novel or unique to a Multi Axes Tower Fan of the present invention, and are not further described.

In operation, paired sun and planet airfoils in motion around the stationary sun rotor in one rotation reciprocate from a power and a return cycle in generating power from generally straight flowing applied wind, or from been powered to propel generally straight flowing wind. Planet airfoils, been in a fixed rotational orientation relative to and in rotations around a stationary sun rotor, are always facing against applied or toward propelled generally straight flowing wind. Different from planet airfoils, sun airfoils are in radial alignment to and in rotation around the sun rotor, and are rotated by generally straight flowing applied wind from any direction, but they rotate from been powered to propel circular swirling wind around the sun rotor. In combination, paired planet and sun airfoils alternate as wind shields in rotations, particularly in return cycles. In a power cycle, paired planet and sun airfoils produce maximum wind induced loads by having both planet and sun airfoils fully exposed or effectively fully exposed to the applied or propelled generally straight flowing wind. In a return cycle, paired planet and sun airfoils produce minimum wind induced loads by having planet and sun airfoils alternated from been fully or partially shielded to applied or propelled generally straight flowing wind. At midpoints of power and return cycles, paired planet and sun airfoils wind induced loads for power cycles are substantially greater than those for return cycles; their bending moment arms for power cycles are also substantially longer than those for return cycles; and their power generated and consumed, been related to torque from loads X bending moment arms, are too substantially more for power cycles (maximum loads X longer arms) than power lost or consumed for return cycles (minimum loads X shorter arms). Paired planet and sun airfoils performances of power produced or consumed at mid points of power and return cycles represent reasonably their performances in complete rotations through power and return cycles. Therefore, a Multi Axes Wind Turbine generates a net of substantially more power from generally straight flowing wind; and, in reverse, a Multi Axes Tower Fan, from been powered, propels a net of substantially greater volume of generally straight flowing wind.

In summary, a Multi Axes Turntable, Wind Turbine, and Tower Fan of the present invention is a compilation of separate and related inventions for a Multi Axes Turntable, a Multi Axes Wind Turbine, and a Multi Axes Tower Fan, where: a Multi Axes Turntable consists of multiple (one or more) planet rotors in a fixed rotational orientation relative to and in rotations around a stationary sun rotor; and a Multi Axes Wind Turbine and Tower Fan are each a Multi Axes Turntable in rotations with mounted pairs of planet and sun airfoils. Planet airfoils, been in a fixed rotational orientation relative to and in rotations around a stationary sun rotor, are always facing against applied or toward propelled generally straight flowing wind. Different from planet airfoils, sun airfoils are in radial alignment to and in rotation around the sun rotor, and are rotated by generally straight flowing applied wind from any direction, but they rotate from been powered to propel circular swirling wind around the stationary sun rotor. In combination, paired planet and sun airfoils alternate as wind shields in rotations around a stationary sun rotor to eliminate or greatly reduce power lost from rotations. A Multi Axes Wind Turbine in rotation generates a net of substantially more power than power lost from generally straight flowing applied wind; while a Multi Axes Tower Fan, in reverse rotation and been powered, propels a net of substantially greater volume of generally straight flowing propelled wind than wind volume propelled in reverse. A Multi Axes Wind Turbine and Tower Fan are reversible, by having the same basic Multi Axes Turntable mounted with same paired planet and sun airfoils, but reversed in rotations, and with obvious differences in power generators, motors, and control systems. This reversible feature is unknown in current non shielded or ducted VAWTs and tower fans. Compared to current VAWTs and tower fans, a Multi Axes Wind Turbine and Tower Fan are inherently more power efficient due to planet airfoils having a fixed rotational orientation always facing against or toward generally straight flowing applied or propelled wind.

DESCRIPTION OF THE PREFERRED EMBODIMENT

Figure 1:
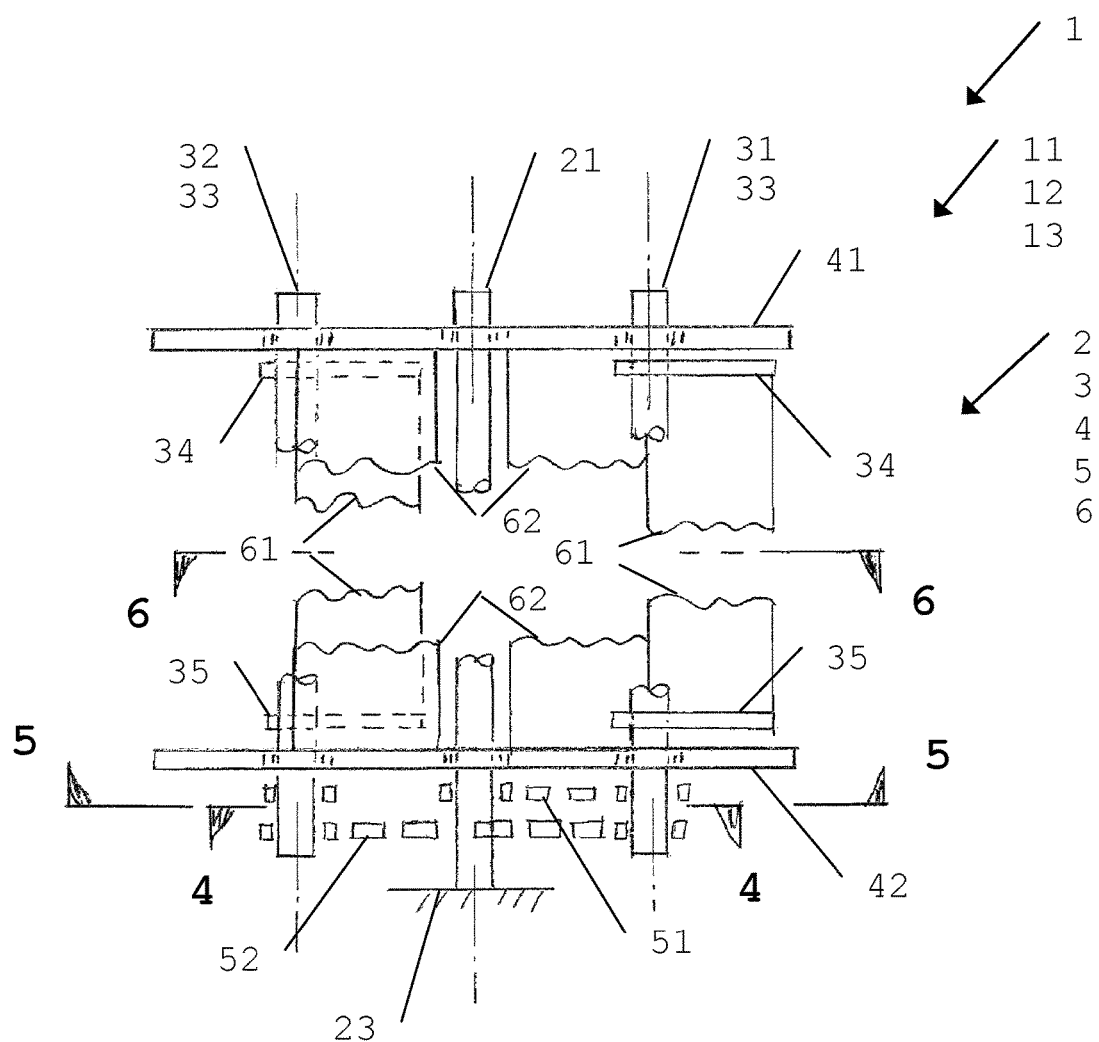
FIG. 1 is an elevation view of the preferred embodiment of the present invention.
Figure 2:
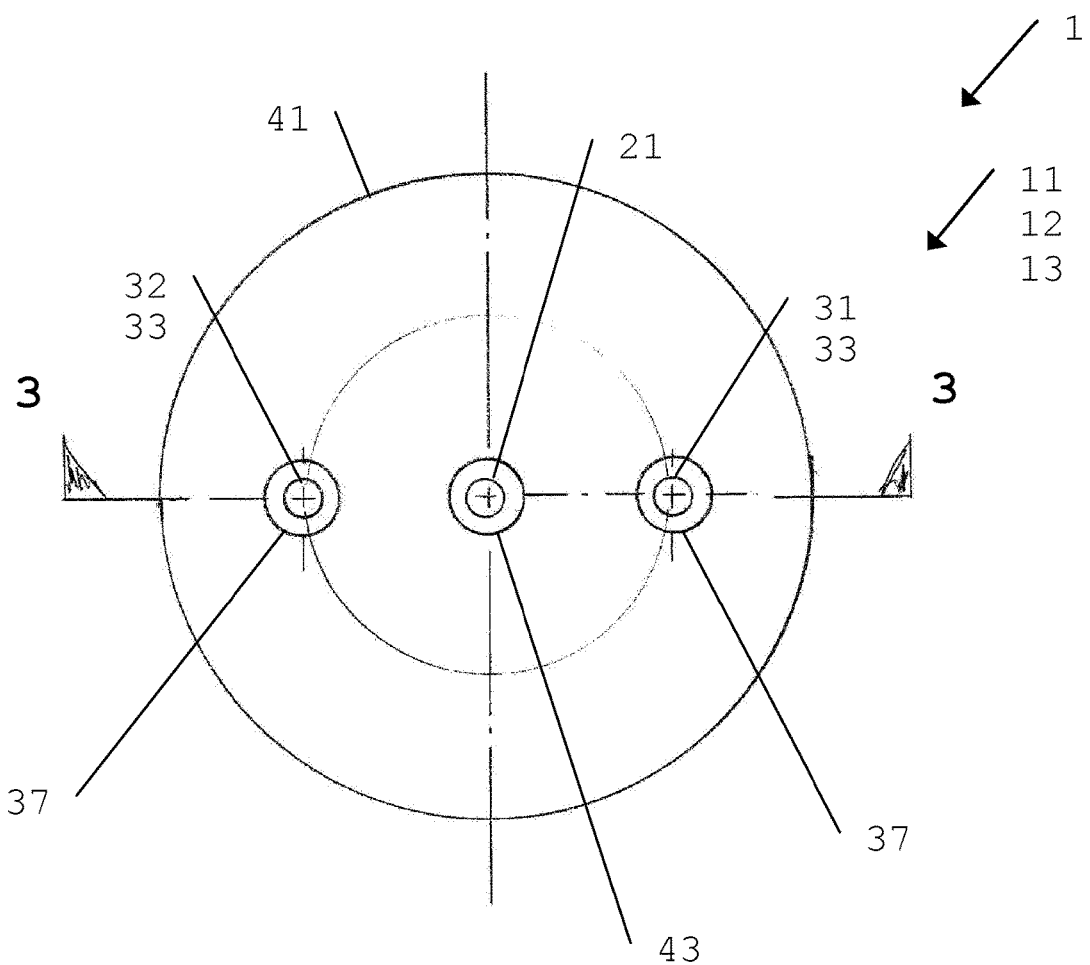
FIG. 2 is a top view of the preferred embodiment of the present invention.

A Multi Axes Turntable, Wind Turbine, and Tower Fan is disclosed by a preferred embodiment of the present invention, where the preferred embodiment, for simplicity, has: two planet rotors rotating around a stationary sun rotor; and paired planet and sun airfoils are one quarter circles in shape and share the same circular center points. The preferred embodiment is simplified to show with clarity its features and advantages, including: a Multi Axes Wind Turbine and its paired planet and sun airfoils, in one counter clockwise rotation around the stationary sun rotor, generates a net of substantially more power than power lost from generally straight flowing applied wind; in reverse, a Multi Axes Tower Fan and its paired planet and sun airfoils, in one clockwise rotation around the stationary sun rotor, and been powered, propels a net of substantially greater volume of generally straight flowing wind than wind volume lost in reverse; a Multi Axes Wind Turbine and Tower Fan are reversible; and a Multi Axes Wind Turbine and Tower Fan are inherently more power efficient due to planet airfoils persistently facing against or toward generally straight flowing applied and propelled wind.

These and other features and advantages of the present invention will become more apparent to one skilled in the art from the following description and claims when read in light of the accompanying drawings for the preferred embodiment of a simplified present invention.

Unless otherwise apparent, or stated, directional references, such as "inner," "inward," "outer," "outward," "downward," "upper", "lower" etc., are for non-limiting descriptive purposes and intended to be relative to the orientation of a particular Multi Axes Turntable, Wind Turbine, or Tower Fan of the present invention as shown in the view of that apparatus.

Referring to FIGS. 1 thru 6, preferred embodiment 1 consists a compilation of separate and related Multi Axes Turntable 11, Multi Axes Wind Turbine 12, and Multi Axes Tower Fan 13, where: Multi Axes Turntable 11 comprises sun rotor assembly 2, planet rotor assembly 3, carrier plate assembly 4, and chain drive assembly 5; Multi Axes Wind Turbine 12 comprises Multi Axes Turntable 11 in counter clockwise rotation with mounted airfoils assembly 6 for power generation from generally straight flowing applied wind; and Multi Axes Tower Fan 13, which is modified Multi Axes Wind Turbine 12, but rotating clockwise in reverse, for been powered to propel generally straight flowing wind.

Sun rotor assembly 2 is further comprised of stationary sun shaft 21, with mounted drive sprocket 22, and fixed base support 23. Planet rotor assembly 3 is further comprised of planet rotor 31 and 32, and each planet rotor 31 and 32 has rotating planet shaft 33. Mounted on each rotating planet shaft 33 are: cap plate 34, base plate 35, drive sprocket 36a, follower sprocket 36b, and bearing 37. Rotating planet rotors 31 and 32 are equally spaced on a circumference around, and are at same radial distances away from stationary sun rotor shaft 21. And each rotating planet rotors 31 and 32 is jointed and supported through bearing 37 to top and bottom carrier plates 41 and 42 of carrier plate assembly 4. Top and bottom carrier plates 41 and 42 rotate around and are jointed and supported through bearings 43 to stationary sun shaft 21. Sun drive sprocket 22, planet drive sprocket 36a, and planet follower sprocket 36b are identically in diameter and number of teeth.

Figure 3:
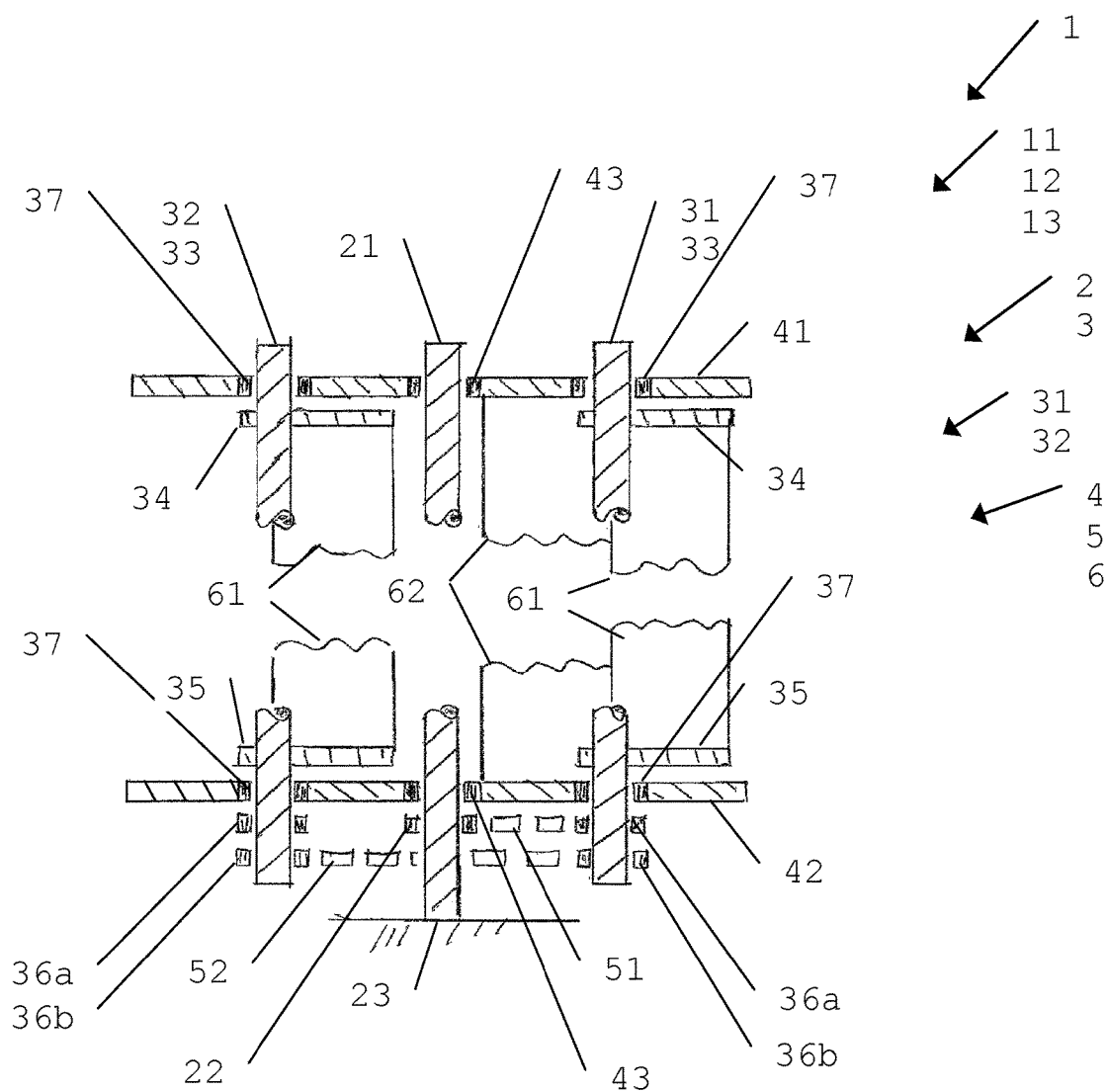
FIG. 3 is a cross section view of the preferred embodiment of the present invention taken along line 3-3 shown in FIG. 2.
Figure 4:
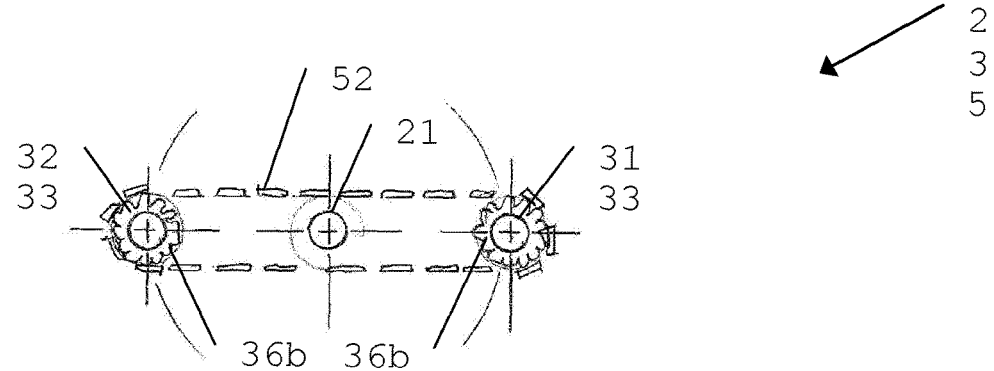
FIG. 4 is a cross section view of the preferred embodiment of the present invention taken along line 4-4 shown in FIG. 1.
Figure 5:
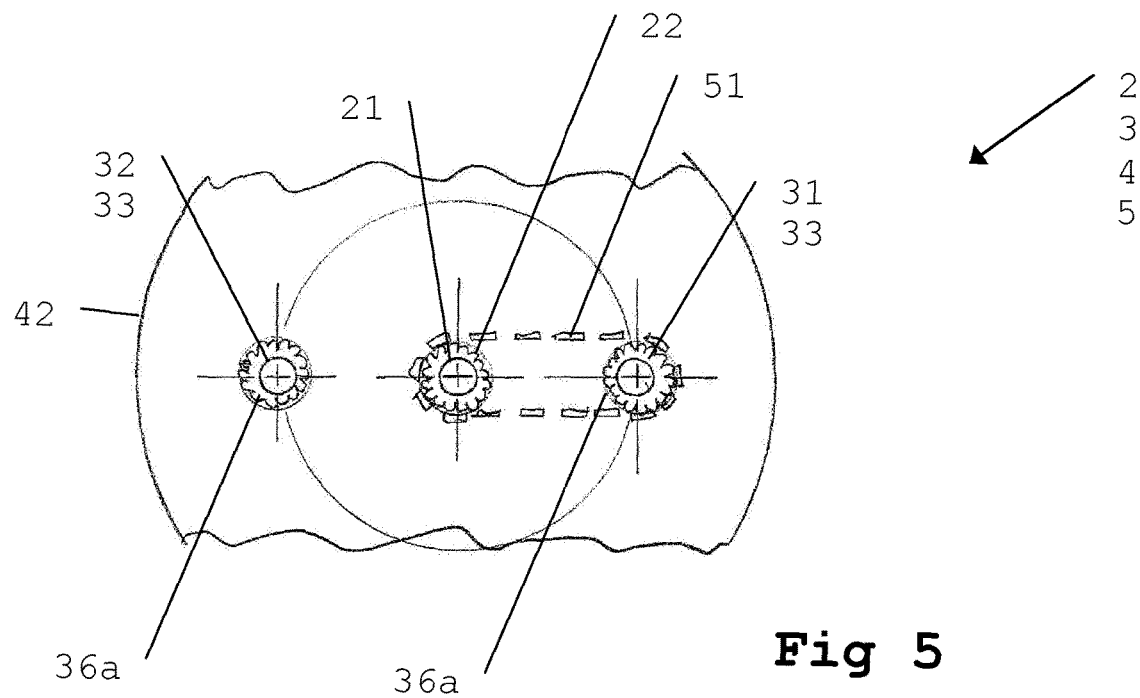
FIG. 5 is a cross section view of the preferred embodiment of the present invention taken along line 5-5 shown also in FIG. 1.

Shown in particular in FIGS. 3, 4, and 5 are chain drive assembly 5 in driving planet rotor assembly 3 with its planet rotors 31 and 32 around sun rotor assembly 2, where chain drive assembly 5 is further comprised of drive chain 51 and follower chain 52. Planet rotor 31 and its rotating shaft 33 are rotated around stationary sun rotor shaft 21 by drive chain 51 through planet drive sprocket 36a and sun drive sprocket 22. Planet rotor 31 and its rotating shaft 33, been rotated by planet drive sprocket 36a and sun drive sprocket 22 with same sprocket diameter and number of sprocket teeth, is in a fixed rotational orientation relative to and in rotation around stationary sun rotor shaft 21. Planet rotor 32 and its rotating shaft 33, been rotated by follower chain 52 to follow planet rotor 31 and its rotating shaft 33 through follower sprockets 36a, are also rotated around stationary sun rotor shaft 21, and have same fixed rotational orientations relative to and in rotations around stationary sun rotor shaft 21.

Figure 6:
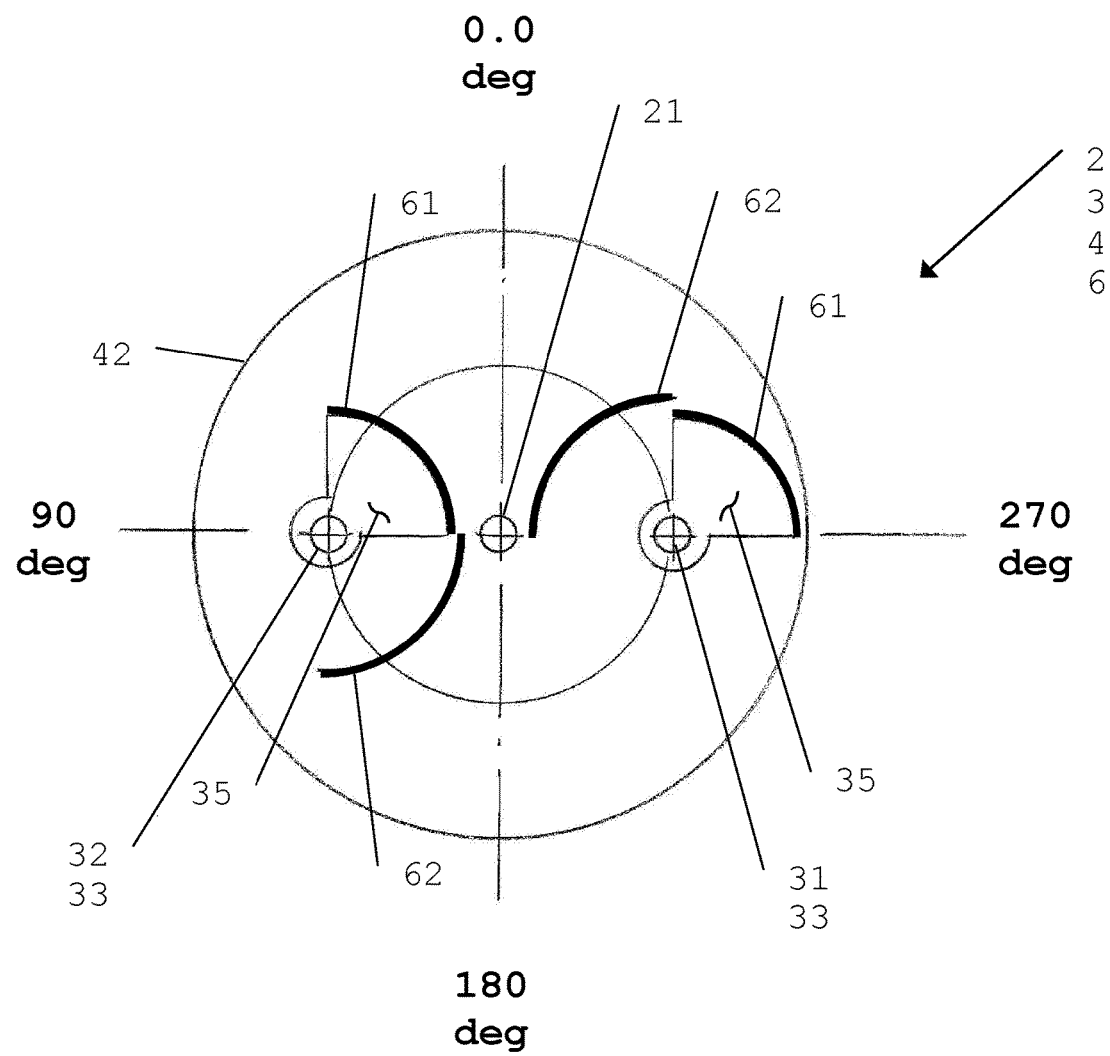
FIG. 6 is a cross section view of the preferred embodiment of the present invention taken along line 6-6 shown also in FIG. 1.

Airfoils 6 assembly, shown in FIG. 6, is further comprised of two planet airfoils 61 and two sun airfoils 62, where: each planet airfoils 61 is mounted to each of planet rotors 31 and 32 through cap plates 34 and base plates 35; and each sun airfoils 62, paired to one planet airfoil 61, is mounted to top and bottom carrier plates 41 and 42. Planet airfoils 61, been mounted to planet rotors 31 and 32, are also in a fixed rotational orientation relative to and in rotations around stationary sun rotor shaft 21. Sun airfoils 62, been mounted to top and bottom carrier plates 41 and 42, are in radial alignment to and in rotation around stationary sun rotor shaft 21. Paired planet airfoil 61 and sun airfoil 62, mounted indirectly or directly to top and bottom carrier plates 41 and 42, have same rotational rate around stationary sun rotor shaft 21.

Paired planet airfoils 61 and sun airfoils 62 are curved one quarter circle in shape, and share the same circular center point. Sun airfoil 62 is slightly larger in radius than planet airfoil 61 for clearances as planet airfoil 61 rotates about its rotation center point passing by its paired sun airfoil 61. And the radius of planet airfoil 61 is limited by the radial distance to stationary sun rotor shaft 21.

Figure 7:
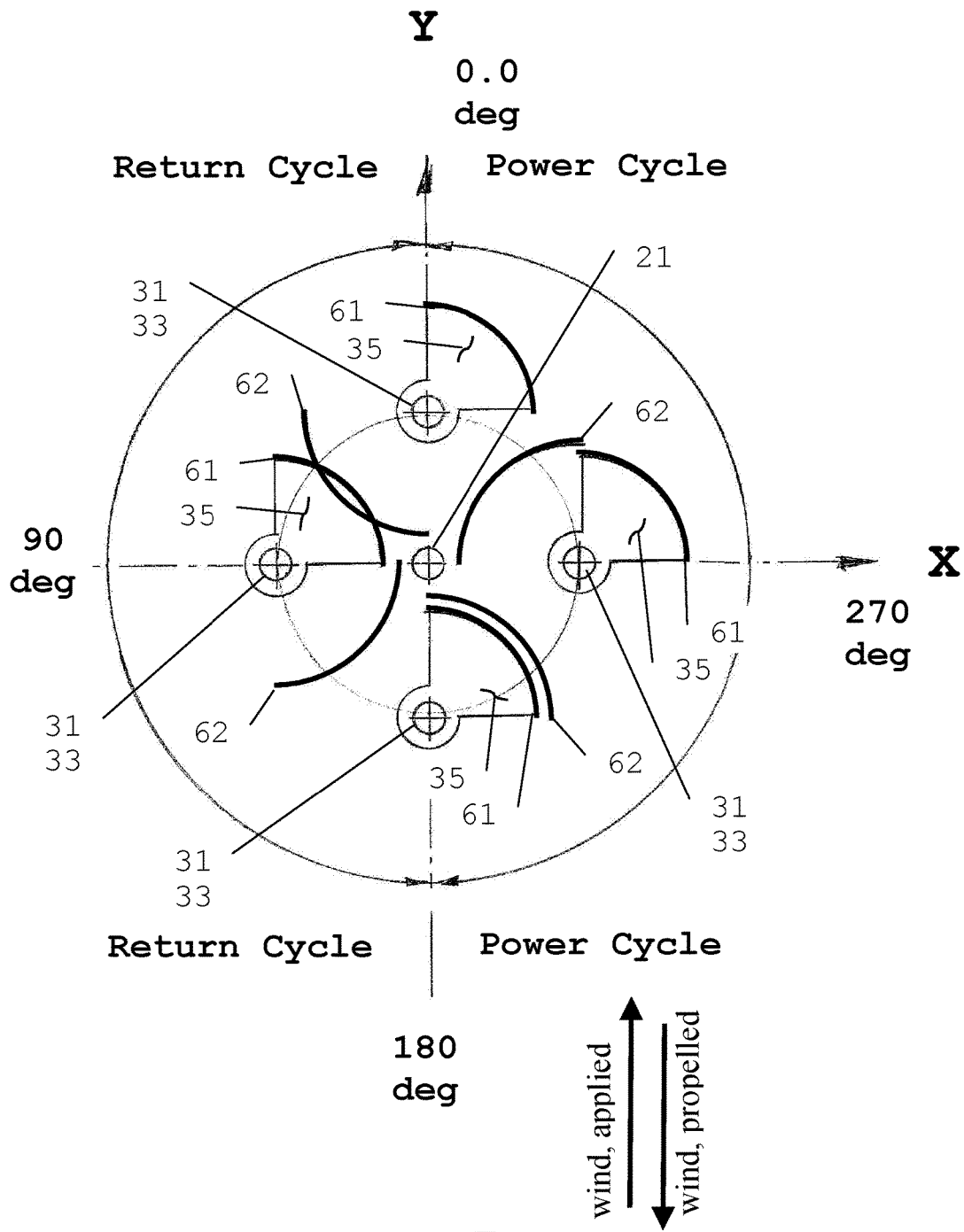
FIG. 7 is a schematic plan view of the preferred embodiment for the right side paired planet and sun airfoils shown in FIG. 6 in one rotation around the stationary sun shaft at 90 degree angle increment.

In operation, as shown by FIG. 7, planet rotor 31 with its rotating planet shaft 33, planet base plate 36, and paired planet airfoil 61 and sun airfoil 62, are located in 90 degrees increments apart at 0, 90, 180, 270, and back to 0 degrees; and they are in rotation counter clockwise for Multi Axes Wind Turbine 12 or clockwise for Multi Axes Tower Fan 13 around stationary sun rotor shaft 21. Planet airfoil 61 is in a fixed rotational orientation relative to and in rotation around stationary sun rotor shaft 21. Sun airfoil 62 is in radial alignment to and in rotation around stationary sun rotor shaft 21. Paired sun and planet airfoils 61 and 62 in one counter clockwise or clockwise rotation around stationary sun rotor shaft 21 reciprocates from a power cycle to a return cycle. The power cycle is at the right half of a rotation, and the return cycle is at the left half of a rotation, separated by end points at 0 and 180 degrees. The mid points of power and return cycles are at 270 and 90 degrees, respectively. Also shown in the Figure are directions of generally straight flowing applied or propelled wind along 'y' axis in an x-y coordinate system.

Performances of paired planet and sun airfoils 61 and 62 at the four locations 90 degrees apart provides a picture of performances of paired planet and sun airfoils 61 and 62 in their rotations through power and return cycles around stationary sun shaft 21. Power generated or consumed, as performances of paired planet and sun airfoils 61 and 62, is a function of toque, which is loads X (or multiplied by) arms; where load is wind induced load, restricted for simplicity to be along 'y' axis in alignment to the wind, and arm is bending moment arm in distance along 'x' axis between planet rotating shaft 33 and sun stationary shaft 21. Paired planet airfoil 61 and sun airfoils 62 interact in rotations around stationary sun shaft 21 alternate as full or partial wind shield, particularly in the return cycles, to eliminate or greatly reduce wind induced load from generally straight flowing applied or propelled wind. And paired planet airfoil 61 and sun airfoil 62 has continuous changing bending moment arms along 'x' axis as they rotate around stationary sun shaft 21 from wind induced loads.

Performance is assessed for Multi Axes Wind Turbine 12 in counter clockwise rotations with mounted paired planet airfoil 61 and sun airfoils 62 in facing against generally straight flowing applied wind; where for simplicity, wind induced load is restricted to be along 'y' axis, and bending moment arm is in distance along 'x' axis. At 0 and 180 degrees end points of power and return cycles: the total wind induced loads for the two end points are somewhat balanced to be effectively 0.0; their bending moment arms are also somewhat balanced to be effectively 0.0; and their total torque is, therefore, 0.0. At 90 degrees mid point of a return cycle: the wind induced loads are minimum with planet airfoil 61 fully shielded from applied wind and back of sun airfoil 62 faces against applied wind; their bending moment arms are short; and the total torque is, therefore, minimum force X short arm. And at 270 degrees mid point of a power cycle: the wind induced loads are maximum with planet airfoil 61 and sun airfoil 62 fully exposed to the applied wind; their bending moment arms are long; and the total torque is, therefore, maximum force X long arm. In one counter clockwise rotation through a power and a return cycle of the four locations 90 degrees apart, paired planet airfoil 61 and sun airfoil 62 produces a substantial greater torque (maximum force X long arm) in a power cycle than torque lost (minimum force X short arm) in a return cycle. Multi Axes Wind Turbine 12 in one counter clockwise rotation around stationary sun shaft 21 generates a net of substantial more wind power in a power cycle than wind power lost in a return cycle.

Performance is assessed for Multi Axes Tower Fan 13 in one clockwise rotation with mounted paired planet airfoil 61 and sun airfoils 62 in facing against generally straight flowing applied wind; where for simplicity, wind induced load is restricted to be along 'y' axis, and bending moment arm is in distance along 'x' axis. At 0 and 180 degrees end points of power and return cycles: the total wind induced loads for the two end points are effectively 0.0, with planet airfoil 61 and sun airfoils 62 mostly propelling cross wind; their bending moment arms are somewhat balanced to be effectively 0.0; and their total torque is, therefore, 0.0. At 90 degrees mid point of a return cycle: the wind induced loads are minimum with sun airfoil 62 shielded and back of planet airfoil 61 faces toward propelled wind; their bending moment arms are short; and the total torque is, therefore, minimum force X short arm. And at 270 degrees mid point of a power cycle, the wind induced loads are maximum with planet airfoil 61 and sun airfoil 62 fully exposed to the propelled wind; their bending moment arms are long; and the total torque is, therefore, maximum force X long arm. In one clockwise rotation through a power and a return cycle of the four locations 90 degrees apart, paired planet airfoil 61 and sun airfoil 62 produces a substantial greater torque (maximum force X long arm) in a power cycle than torque lost (minimum force X short arm) in a return cycle. Multi Axes Tower Fan 13 in one clockwise rotation around stationary sun shaft 21 propels a net of substantially greater volume of generally straight flowing propelled wind in a power cycle than propelled wind volume lost in a return cycle. Multi Axes Tower Fan 13 also propels a secondary volume of cross air.

The preferred embodiment described above is for the purpose of describing features and technical conceptions of a simplified Multi Axes Turntable, Wind Turbine, and Tower Fan of the present invention, consisting most importantly of two planet rotors with paired planet and sun airfoils that are a quarter circles in shape and sharing the same circular center point. But it should be readily apparent that the invention is not limited to the described preferred embodiment alone, and a person skilled in the art may come up with various changes and modifications consistent to the technical concept disclosed herein and within the spirit and scope of the invention. Prime examples of changes and modifications to the described preferred embodiment includes: the number of planet rotors; the shapes, sizes, numbers, and types (lift, drag, or hybrid) of planet and sun airfoils; the alternatives to chain drives systems, such as belt drive or gear box drive systems; and the balancing of rotational forces by pairing of counter rotating Multi Axes Turntables, Wind Turbines and Tower Fans. Where stated, "wind" is broadly meant to be any fluid medium, including water. Required systems such as power generators, motors, airfoils orientation mechanism, and controls are neither novel nor unique systems, and are not further described in the preferred embodiment of the present invention. Also, a Multi Axes Tower Fan is known by other names and for such other applications as names used in a linear propulsion system. Therefore, it is to be understood that modifications and variations may be utilized without departure from the spirit and scope of the invention disclosed herein, as those skilled in the art will readily understand. Such modifications and variations are considered to be within the purview and scope of the claimed invention and their equivalents.

I claim:

1. A Multi Axes Wind Turbine comprising:
a) an airfoils assembly comprised of multiple pairs of planet and sun airfoils; where one planet airfoil is mounted to one rotating planet rotor through cap and base plates, the rotating planet rotor is mounted to top and bottom carrier plates, and the one planet airfoil is in a fixed rotational orientation relative to and in rotation around a stationary sun rotor shaft; and one sun airfoil, mounted to the top and bottom carrier plates, and paired to one planet airfoil, is in radial alignment to and in rotation around the stationary sun rotor shaft;
b) the paired planet airfoil and sun airfoil, are mounted indirectly or directly to the carrier plates, and have the same rotational rate around the stationary sun rotor shaft; they are curved in shapes similar to portions of semi circles, and sharing the same or nearby curved center points; a sun airfoil is slightly larger than and makes one rotation around its paired planet airfoil in every one rotation around the stationary sun rotor; and the planet airfoil is sized, to be freely rotating, and is limited in size by the radial distance to the stationary sun rotor;
c) in one rotation around a stationary sun rotor shaft, paired planet and sun airfoils move through a reciprocal half a rotation power and return cycles, where;
the half a rotation power and return cycles are where planet airfoils face toward and away from applied wind, in rotations, the planet airfoils with paired sun airfoils that have rotated away are always facing against applied generally straight flowing wind;
the sun airfoils with paired planet airfoils having rotated away are rotated by generally straight flowing applied wind from any direction; and
in combination, the paired planet and sun airfoils alternate as wind shields in rotations, particularly in return cycles;
d) in a power cycle, paired planet and sun airfoils produce maximum wind induced loads, particularly at midpoints of power cycles, by having both planet and sun airfoils fully exposed to the applied generally straight flowing wind;
in a return cycle, paired planet and sun airfoils produce greatly reduced and minimum wind induced loads, particularly at midpoints of return cycles, by having planet and sun airfoils alternating as wind shields to be fully or partially shielded from generally straight flowing wind; and
at midpoints of power cycles, paired planet and sun airfoils have both maximum wind induced loads and longer bending moment arms than those at midpoints of return cycles;
e) paired planet and sun airfoils in one rotation around a stationary sun rotor are measured for performance by power generated, with power generated related to torques equal to loads X bending moment arms, where:
at mid points of the power and return cycle, power generated is substantially more for power cycles (maximum loads X longer arms) than the power lost during return cycles (minimum loads X shorter arms); and
power generated at mid points of power and return cycles represent their performances during complete rotations through power and return cycles;
f) the Multi Axes Wind Turbine in rotations with mounted paired planet and sun airfoils generates a net of substantial power from generally straight flowing wind; and
g) a power generator and control system to convert wind power to mechanical or electrical power; and an orientation mechanism and control system to rotate planet airfoils to face against generally straight flowing wind; and
h) operated in reverse, with power motors replacing generators, and with paired planet and sun airfoils rotating in reverse, the Multi Axes Wind Turbine propels a substantial volume of generally straight flowing wind or airflow.

* * * * *